United States Patent Office 3,067,092
Patented Dec. 4, 1962

3,067,092
FUNGICIDAL AMINE SALTS
Hans Feichtinger, Dinslaken, and Siegfried Puschhof, Duisburg-Beeck, Germany, assignors to Ruhrchemie Aktiengesellschaft, Oberhausen-Holten, Germany, a German corporation
No Drawing. Filed Oct. 1, 1958, Ser. No. 764,492
Claims priority, application Germany June 6, 1957
1 Claim. (Cl. 167—22)

This invention relates to the production of amine salts chlorinated in the carbon chain and having fungicidal properties.

Compounds having insecticidal and fungicidal activity and consisting of aminated chlorohydrocarbons or salts thereof are disclosed in British Patent No. 565,469. These compounds are produced by first treating suitable hydrocarbon fractions, e.g., dodecane fractions, with gaseous chlorine until the chlorination product contains about 40–48% of chlorine. These chlorinated hydrocarbons are treated with ammonia in an alkaline solution at an elevated temperature and an elevated pressure. In doing so, ammonium chloride is formed as an undesirable by-product which must be removed by filtration. The remaining chlorine-containing amine compounds are neutralized with hydrochloric acid and boiled in a dilute aqueous solution. The tarry residues thereby precipitated are separated and the aminated chlorination products are then precipitated with caustic soda and dried. The corresponding amine salts are recovered from the dry precipitates with free acids. This method always results in dark brown colored products.

These known aminated chlorohydrocarbons have the disadvantage that only very low yields are obtainable in their production. For example, from about 100 kilograms of hydrocarbon, only 50 kilograms of final product containing about 10% of chlorine in the carbon chain are obtained when substituting 70–75 kilograms of chlorine. Large amounts of the chlorine charged are lost for the production of the insecticidal and fungicidal compositions.

It has been found that fungicidal compositions are obtained with a considerably higher yield and a substantially higher activity if aliphatic or cycloaliphatic amine hydrochlorides or other amine salts, e.g., amine sulfates, are chlorinated to a degree as to contain 2 to 15 gram atoms of chlorine per mol amine.

The chlorine-containing amine salts produced in this manner display considerable advantages over the known aminated chlorohydrocarbons. In their production, the chlorine used in the chlorination of the amine salt is practically completely utilized. For example, starting from 100 kilograms of amine salt, it is possible by using 150 kilograms of chlorine to obtain 250 kilograms of an amine salt which is chlorinated in its carbon chain so that considerably higher yields are obtained as compared with those of the known production processes. It is particularly essential that amine salts and particularly amine hydrochlorides which, for example, contain 40% up to more than 55% of chlorine in the carbon chain can be obtained when chlorinated by the process of the invention.

Chlorination of amine hydrochlorides including an aliphatic carbon chain having 3 or more carbon atoms is described in Patent 2,763,610. According to this patent chlorination of the aliphatic carbon chain is effected by contacting chlorine gas with amine hydrochlorides present in a homogeneous or heterogeneous phase to introduce chlorine into the chain. For primary aliphatic amine hydrochlorides taken as an example, the reaction proceeds in the following manner:

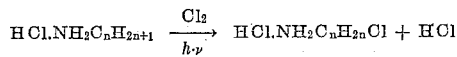

wherein $n$ is a whole number for the carbon atoms present in a straight or branched aliphatic chain. Up to the present, amine hydrochlorides were used wherein the aliphatic chain contained up to 11 carbon atoms and wherein 1 gram atom of chlorine was substituted. For amine hydrochlorides werein the aliphatic chain contains about up to 8 carbon atoms, the chlorination mixtures obtainable in this manner are solid and crystalline compounds. However, for amine hydrochlorides wherein the aliphatic chain contains more than 8 carbon atoms, the products obtained by the chlorination method described in this patent are oily substances. This is the case, for example, for undecylamine. If one gram atom of chlorine is introduced into this amine hydrochloride, the chlorination mixture is obtained as an oily substance after evaporation of the solvent. The same observations are made in case of cycloaliphatic amine hydrochlorides having the same number of carbon atoms, if the same amount of one gram atom of chlorine is introduced into the molecule.

Oily chlorination products are unsuitable for many applications, and it is an object of the present invention to provide for the production of solid chlorinated amine salts having a higher number of carbon atoms. It is a further object of the present invention to use these solid chlorination mixtures as fungicides.

It has been found that solid products can also be obtained from amine salts having more than 3 carbon atoms in the molecule if more than 2 gram atoms of chlorine per molecule are introduced into the aliphatic or cycloaliphatic radical. The chlorination products, in addition to being solids at normal temperature, have the surprising property that they are readily soluble in isopropyl alcohol and also in toluene.

The compounds of the invention are chlorinated amine salts of the formula

A.X wherein A is a salt-forming component combined like a salt and selected from the group consisting of HCl and ½H$_2$SO$_4$ and X is an amine selected from the class consisting of primary, secondary or tertiary amines including at least one radical containing a carbon chain of more than 5 carbon atoms and from 2 to 15 gram atoms of chlorine. The amine moiety can be an aliphatic, cycloaliphatic, or aliphatic-cycloaliphatic amine, and can also be an amine in which the nitrogen is bound in a cyclic position of a cycloaliphatic radical.

Suited for the chlorination reaction are the hydrochlorides or sulfates of the general formula

A.NR$_1$R$_2$R$_3$ wherein A is the salt-forming component, i.e. hydrogen chloride (HCl) or sulfuric acid (½H$_2$SO$_4$) while R$_1$, R$_2$ and R$_3$ are optionally hydrogen, alkyl or cycloalkyl radicals of which, however, one radical must be a saturated aliphatic or cycloaliphatic radical having a carbon chain of at least 6 carbon atoms.

It is also possible to chlorinate monovalent or polyvalent cycloaliphatic amines containing the nitrogen in a cyclic or justanuclear position.

For example, in case of primary aliphatic amine salts the chlorination reaction may be effected in accordance with the following general reaction scheme:

wherein $n$ is a whole number of 6 to 18 carbon atoms and $x$ is the amount of chlorine substituted within the amine molecule by the chlorination process and expressed in gram atoms of chlorine. Examples of amine salts to be charged within the scope of the reaction described above are hydrochlorides and sulfates of hexylamine, octylamine, nonylamine, decylamine, undecylamine, dodecylamine, tetradecylamine, hexadecylamine and octadecylamine.

In the same manner, the amine salts of the following general formula may also be used for the chlorination:

$$A.NH_2C_nH_{2n-1} \quad A.NH_2C_nH_{2n-3} \quad A.NH_2C_nH_{2n-5}$$

Depending upon the number of hydrogen atoms, the amine salts contain one, two or three cycloaliphatic rings. Examples of the salts included in these general formulae are the hydrochlorides and sulfates of cyclopentylmethylamine, cyclohexylamine, cyclohexylmethylamine, bicyclo-(4.4.0)-decane amine, aminomethyl-tricyclo-$(5.2.1.0^{2.6})$-decane and others of similar constitution.

Furthermore, those amine salts containing two or also three of the general aliphatic and/or cycloaliphatic radicals mentioned above may also be subjected to the chlorination. Thus, any primary, secondary or tertiary amine containing one or more aliphatic and/or cycloaliphatic radicals may be used for the reaction being the object of this invention. Hydrochlorides or sulfates meeting these constitutional conditions are those of dihexylamine, didodecylamine, dicyclohexylamine, dihexyl-cyclohexylamine, methyldicyclohexylamine, hexyl-dicyclo-hexylamine and others of similar constitution.

Suitable secondary or tertiary amines also include compounds having only one aliphatic or cycloaliphatic radical containing a carbon chain of more than about 5 carbon atoms while the other two aliphatic radicals contain a carbon chain of less than 5 carbon atoms. Examples of this type include the salts of dimethylhexylamine, dimethylcyclohexylamine, diethyl-octylamine, dimethyldecylamine, diethyltetradecylamine, methyloctylamine, methyldodecylamine, ethyldodecylamine, methylbicyclo-(4.4.0)-decane-amine, and others of similar constitution.

In accordance with the invention, the chlorination is carried out in the presence of solvents or suspending agents which are inert to chlorine. For this purpose, the amines are dissolved in chlorinated hydrocarbons, preferably carbon tetrachloride, and neutralized with dry gaseous hydrogen chloride or concentrated sulfuric acid at room temperature, said neutralization being effected while cooling if required. Depending upon the constitution of the starting amine, there are formed suspensions or solutions of the amine salts, the chlorination of which takes place by introducing chlorine while irradiating with actinic light. To permit convenient passage of the chlorine gas through the reaction mixture, it is advantageous to apply 5 to 20 times the amount of the diluting agents. The radical-forming light source is a mercury vapor lamp of conventional design which may be arranged externally of the light-transmitting reaction vessel or inside thereof. In place of the mercury vapor lamp, a normal electric lamp may serve as the source of radiation. The chlorination may also be carried out by means of other radical-controlled halogenation methods, e.g. by a treatment with sulfuryl chloride in the presence of benzoyl peroxide or light. The chlorination may be effected without the use of pressure at room temperature, but also at the boiling point of the reaction solution or suspension. If the reaction is intended to proceed at still higher temperatures, the halogenation must be effected under pressure.

The absorption of chlorine into the amine salts is extremely rapid and nearly quantitative in the beginning with an equivalent amount of hydrogen chloride being released. As the quantity of halogen substitution in the aliphatic and/or cycloaliphatic hydrocarbon radical increases, the rate of chlorination constantly decreases so that correspondingly longer reaction periods are required in the case of high degrees of chlorination ($x=8$ to 15).

The determination of the degree of chlorination is effected by deducting from total chlorine, as determined in the Parr bomb, the amount of ionically bonded chlorine which is titratable by the Volhard method.

The chlorination products are oily and pasty substances in the case of lower degrees of chlorination and are converted to solid white powders as additional chlorine is absorbed.

After having driven off the excess solvent or suspending agent, the reaction mass is left as a solid resinous mass or as a white powder. The substances are amorphous and do not show defined melting points. The softening points as dependent upon the particular amount of chlorine substituted are not capable of being exactly determined and are in a wide range of temperature.

The amines needed for the chlorination may be of uniform nature, but may also be isomeric mixtures of the same molecular size and also mixtures of amine salts of different molecular sizes. The amines may be prepared in any manner, e.g. from olefins by means of the Oxo reaction via aldehydes or alcohols and subsequent reaction with ammonia and hydrogen.

By introducing more than one gram atoms of chlorine, the physical properties of the amine salts, especially their solubility in various solvents, are largely modified. The solubility in toluene and other aromatic solvents of chlorination products containing about 3–15 and particularly 4–10 gram atoms of chlorine per mol of amine salt increases as the chlorine content increases, which property makes the novel mixtures of compounds particularly suitable for emulsion concentrates of fungicides. In an analogous manner, the dissolving power of isopropyl alcohol also increases, in which, as is known, non-chlorinated amine salts are sparingly soluble.

The new chlorination products being the object of the invention may be used as fungicides, insecticides or bactericides and also as emulsifiers, wetting agents and impregnating agents. Moreover, the compounds obtained are valuable as intermediates in numerous organic chemistry synthesis reactions.

The following examples illustrate the method of the invention:

EXAMPLE 1

101.2 grams (1.00 mol) of n-hexylamine were dissolved in 1200 cc. of carbon tetrachloride in a three-necked flask of 2 liters, capacity provided with a reflux condenser, a thermometer, a gas inlet pipe and a stirrer, and neutralized with 22.3 liters (1.00 mol) of hydrogen chloride at 10–20° C. Thereafter, 90 liters of chlorine were introduced within 9 hours into the suspension of the hexylamine hydrochloride heated at 60° C. while irradiating with a mercury vapor lamp. By concentrating the reaction product by evaporation in a water-jet vacuum, the hexylamine hydrochloride chlorinated in its carbon chain could be obtained as a white powder having the average formula $HCl.NH_2C_6H_{9.1}Cl_{3.9}$. This compound was readily soluble in water and isopropyl alcohol.

EXAMPLE 2

64.6 grams (0.50 mol) of n-octylamine were dissolved in 1 liter of carbon tetrachloride in a three-necked flask of 2 liters, capacity and neutralized with 12 liters of hydrogen chloride while stirring. Chlorine at a rate of 14 liters/hr. was introduced into the suspension thus obtained of the hydrochloride at 60° C. while irradiating with a mercury vapor lamp. After separation of the solvent under vacuum, the reaction product obtained after 4 hours of chlorination was isolated as a white powder having the formula $HCl.NH_2C_8H_{13.1}Cl_{3.9}$. This compound was readily soluble in water, isopropyl alcohol and toluene.

A reaction product of the formula $HCl.NH_2C_8H_{15}Cl_2$ obtained after 2 hours of chlorination was in form of a yellowish paste which was likewise readily soluble in water and isopropyl alcohol but sparingly soluble in toluene.

EXAMPLE 3

78.6 grams (0.50 mol) of n-decylamine were dissolved in 1 liter of carbon tetrachloride in the manner described in Example 1. After neutralization with hydrogen chloride, chlorine at a rate of 22 liters/hr. was introduced into the solution of the hydrochloride. The product obtained after 2 hours of reaction and separation of the solvent was a white powder having the empirical formula $HCl.NH_2C_{10}H_{15.2}Cl_{5.8}$ and being readily soluble in isopropyl alcohol and toluene.

EXAMPLE 4

92.6 grams (0.50 mol) of n-dodecylamine were dissolved in 1 liter of carbon tetrachloride in a three-necked flask of 2 liters, capacity and neutralized with 12 liters of hydrogen chloride while stirring. Chlorine at a rate of 12 liters/hr. was introduced into the solution thus obtained of the hydrochloride at 60° C. while irradiating with a mercury vapor lamp. After separation of the solvent under vacuum, the reaction product obtained after 8 hours of chlorination was isolated as a white powder having the average formula $HCl.NH_2C_{12}H_{17.6}Cl_{7.4}$. This compound was readily soluble in isopropyl alcohol and toluene, but sparingly soluble in water.

A reaction product of the formula $$HCl.NH_2C_{12}H_{23.8}Cl_{1.2}$$

obtained after 1¼ hours of chlorination was a yellowish paste which was likewise readily soluble in isopropyl alcohol but sparingly soluble in toluene and water.

EXAMPLE 5

106.8 grams (0.50 mol) of n-tetradecylamine were dissolved in 1 liter of carbon tetrachloride. After neutralization with hydrogen chloride, chlorine at a rate of 12 liters/hr. was introduced into the solution of the hydrochloride in the manner described in Example 1. After 8 hours of chlorination, a reaction product having the formula $HCl.NH_2C_{14}H_{20.6}Cl_{8.4}$ was isolated. It consisted of a white powder which was readily soluble in toluene and isopropyl alcohol.

EXAMPLE 6

134.7 grams (0.50 mol) of n-octadecylamine were dissolved in 1 liter of carbon tetrachloride. After neutralization with hydrogen chloride, chlorine at a rate of 24 liters/hr. was introduced into the solution of the hydrochloride in the manner described in Example 1. After 10 hours of chlorination, a reaction product having the formula $HCl.NH_2C_{18}H_{22.8}Cl_{14.2}$ was isolated. It consisted of a white powder which was readily soluble in toluene and isopropyl alcohol.

EXAMPLE 7

In the manner described in Example 1, 71.7 grams (0.50 mol) of 1-amino-3.5.5-trimethyl hexane were dissolved in 1 liter of carbon tetrachloride. After neutralization with hydrogen chloride, chlorine at a rate of 1 liter/hr. was introduced into the suspension of the hydrochloride. A product of the formula $HCl.NH_2C_9H_{15.7}Cl_{3.3}$ obtained after 6 hours of chlorination consisted of a white powder which was readily soluble in water and isopropyl alcohol.

EXAMPLE 8

92.6 grams (0.50 mol) of a dodecylamine mixture obtained from undecylene by the Oxo synthesis and subsequent reaction of the aldehyde with ammonia and hydrogen was dissolved in 1 liter of carbon tetrachloride and neutralized with hydrogen chloride while stirring. Chlorine at a rate of 10 liters/hr. was introduced into the solution obtained of the hydrochloride while irradiating with ultraviolet light. The reaction product obtained after 16 hours of chlorination and freed from the solvent by vacuum distillation was isolated as a white powder having the formula $HCl.NH_2C_{12}H_{17.5}Cl_{7.5}$ and being readily soluble in toluene and isopropyl alcohol.

EXAMPLE 9

100 grams of an amine mixture comprising 9% of n-decylamine, 47% of n-dodecylamine, 18% of n-tetradecylamine and 26% of several other amines was dissolved in 1 liter of carbon tetrachloride in the manner described in Example 1. After neutralization with hydrogen chloride, chlorine at a rate of 12 liters/hr. was introduced into the solution of the hydrochlorides while irradiating with a mercury vapor lamp. The reaction product obtained after 16 hours of chlorination and freed from the solvent by vacuum distillation was a white powder which was readily soluble in toluene and isopropyl alcohol. The content of chlorine in the carbon chain was 53.1% as determined by elementary analysis.

EXAMPLE 10

37.1 grams (0.20 mol) of n-dodecylamine were dissolved in 400 cc. of carbon tetrachloride in a three-necked flask of 1 liter capacity and neutralized by dropwise addition of 10.0 grams of a 100% sulfuric acid. The suspension obtained of the dodecylamine sulfate was treated for 7 hours with 5 liters/hr. of chlorine while irradiating with ultraviolet light and then concentrated by evaporation under vacuum. The white reaction product thus obtained and having the formula $$\tfrac{1}{2}H_2SO_4.NH_2C_{12}H_{19.7}Cl_{5.3}$$

was readily soluble in isopropyl alcohol and toluene.

EXAMPLE 11

92.6 grams (0.50 mol) of di-n-hexylamine were dissolved in 1 liter of carbon tetrachloride in the manner described in Example 1. After neutralization with hydrogen chloride, chlorine at a rate of 6 liters/hr. was introduced into the suspension of the hydrochloride while irradiating with a mercury vapor lamp. The reaction product obtained after 16 hours of chlorination and after evaporation of the solvent had the empirical formula $HCl.NHC_{12}H_{19.7}Cl_{6.3}$ and was a white powder which was readily soluble in toluene and isopropyl alcohol.

EXAMPLE 12

176.7 grams (0.50 mol) of di-n-dodecylamine were dissolved in 800 cc. of carbon tetrachloride and the solution was neutralized with hydrogen chloride. Thereafter, 72 liters of chlorine were introduced within 8 hours into the solution of the hydrochloride in the manner described in Example 1. After evaporation of the solvent and drying of the residue under vacuum, a reaction product having the formula $HCl.NHC_{24}H_{43.9}Cl_{6.1}$ was isolated as a white powder.

EXAMPLE 13

92.6 grams (0.50 mol) of dimethyl-n-decylamine were dissolved in 1 liter of carbon tetrachloride in a three-necked flask of 3 liters capacity and neutralized with hydrogen chloride while stirring. 675 grams (5.0 mols) of sulfuryl chloride and 5 grams of benzoyl peroxide were added to the solution thus obtained of the hydrochloride and the solution was heated for 28 hours on a water bath. The resultant reaction product was freed from the solvent and excess sulfuryl chloride under vacuum and subsequently dried under vacuum for an extended period of time. This resulted in a solid resinous product having the formula $HCl.NC_{12}H_{20.8}Cl_{6.2}$ and being readily soluble in toluene and isopropyl alcohol.

EXAMPLE 14

In an analogous manner as described in the preceding examples, i.e., by neutralization with hydrogen chloride and by introducing chlorine for 16 hours at a rate of 8 liters/hr., 82.6 grams (0.50 mol) of aminomethyltricyclo-(5.2.1.0$^{2.6}$)-decane could be converted into a white pulverulent chlorination product having the formula $$HCl.NH_2C_{11}H_{10.8}Cl_{6.2}$$

and being readily soluble in toluene.

EXAMPLE 15

90.7 grams (0.50 mol) of dicyclohexylamine were dissolved in 1 liter of carbon tetrachloride and the solution was neutralized with hydrogen chloride. Thereafter 60 liters of chlorine were introduced within 12 hours into the solution of the hydrochloride in the manner described in Example 1 while irradiating with a mercury vapor lamp. After removal of the solvent under vacuum, a white solid reaction product having the formula $$HCl.NHC_{12}H_{18.6}Cl_{3.4}$$

was isolated.

EXAMPLE 16

41.8 grams (0.25 mol) of methyl-($\beta$-decalyl)-amine were dissolved in 500 cc. of carbon tetrachloride and neutralized with hydrogen chloride in the manner described in Example 1. By introducing chlorine for 10 hours at a rate of 15 liters/hr., the hydrochloride could be converted into a white pulverulent chlorination product having the formula $HCl.NHC_{11}H_{14.8}Cl_{5.2}$ and being readily soluble in toluene.

EXAMPLE 17

25.4 grams (0.20 mol) of dimethylcyclohexylamine were dissolved in 500 cc. of carbon tetrachloride and the solution was neutralized by dropwise addition of 10.0 grams of a 100% sulfuric acid. The resultant suspension of the sulfate was admixed with 135 grams (1.0 mol) of sulfuryl chloride and heated for 32 hours under a reflux condenser while irradiating with a mercury vapor lamp. Thereafter, the solvent and the excess sulfuryl chloride was distilled off under vacuum and the residue was dried for some time under vacuum. The reaction product obtained had the empirical formula $$\tfrac{1}{2}H_2SO_4NC_8H_{13.9}Cl_{3.1}$$

EXAMPLE 18

In the manner described in Example 1, 20.5 grams (0.10 mol) of methyldicyclohexylamine were dissolved in 500 cc. of carbon tetrachloride and neutralized with hydrogen chloride. Thereafter, 42 liters of chlorine were introduced within 14 hours while irradiating with a mercury vapor lamp. The white powder obtained after separation of the solvent had the formula $HCl.NC_{13}H_{20.8}Cl_{4.2}$.

EXAMPLE 19

78.6 grams (0.50 mol) of n-decylamine were dissolved in 1 liter of carbon tetrachloride in the manner described in Example 2. After neutralization with hydrogen chloride, chlorine at a rate of 22 liters/hr. was introduced into the solution of the hydrochloride. A product obtained after two hours of reaction and separation of the solvent and having the formula $HCl.NH_2C_{10}H_{17.4}Cl_{3.6}$ was a yellow paste which was sparingly soluble in water, toluene and isopropyl alcohol. Continuing the chlorination for additional 2 hours and processing the reaction product resulted in a white powder having the formula $HCl.NH_2C_{10}H_{15.2}Cl_{5.8}$ and being readily soluble in isopropyl alcohol and toluene.

EXAMPLE 20

29.8 grams (0.2 mol) of $\gamma$-n-amyl pyridine were dissolved in 500 cc. of carbon tetrachloride in a three-necked flask of 1 liter capacity provided with a reflux condenser, a thermometer, a gas inlet pipe and a stirrer, and neutralized with hydrogen chloride at 10–20° C. Thereafter, 40 liters of chlorine were introduced within 10 hours into the suspension of the hydrochloride heated at 60° C. while irradiating with a mercury vapor lamp. By concentrating the reaction product by evaporation under vacuum, the $\gamma$-n-amyl pyridine hydrochloride chlorinated in its carbon chain and having the average formula $HCl.NC_{10}H_{12.3}Cl_{2.7}$ could be isolated in a yield of 55.1 grams.

EXAMPLE 21

38.2 grams (0.20 mol) of $\gamma$-n-octyl pyridine were dissolved in 500 cc. of carbon tetrachloride in the manner described in Example 20. After neutralization with hydrogen chloride, chlorine at a rate of 5 liters/hr. was introduced into the solution of the hydrochloride. After 9 hours of reaction and separation of the solvent, a product having the empirical formula $HCl.NC_{13}H_{17.5}Cl_{3.5}$ was obtained in a yield of 69.1 grams.

EXAMPLE 22

31.0 grams (0.20 mol) of $\gamma$-n-amyl piperidine were dissolved in 500 cc. of carbon tetrachloride in the manner described in Example 20. After neutralization with hydrogen chloride, chlorine at a rate of 5 liters/hr. was introduced into the solution of the hydrochloride. After 8 hours of treatment with chlorine, a reaction product having the average formula $HCl.NHC_{10}H_{16.9}Cl_{3.1}$ was isolated in a yield of 59.0 grams.

EXAMPLE 23

39.4 grams (0.20 mol) of $\gamma$-n-octyl piperidine were dissolved in 500 cc. of carbon tetrachloride in the manner described in Example 20. After neutralization with hydrogen chloride, chlorine at a rate of 5 liters/hr. was introduced into the solution of the hydrochloride. By concentrating the reaction product by evaporation in a water-jet vacuum, the $\gamma$-n-octyl piperidine hydrochloride chlorinated in its carbon chain and having the average formula $HCl.NHC_{13}H_{21.3}Cl_{4.7}$ could be obtained in a yield of 78.5 grams.

Since all of the reactions of Examples 1 to 23 by-products are not formed except for the evolution of gaseous hydrogen chloride, the yields, based on amine salt charged and chlorine converted, are quantitative.

The new chlorination mixtures of amine salts exhibit excellent fungicidal properties. To permit a comparison with commercially available preparations, the activity in killing spore germs was determined in standard tests. For testing the new fungicidal products, the amine salts chlorinated in their carbon chain, designated by their empirical formula, were formulated in the manner described below and tested on *Alternaria tenuis* in a spore germination test.

20% by weight of each of the amine salts chlorinated in their carbon chain and prepared in accordance with Examples 2, 3, 4, 5, 7, 8, 9, 10, 14, 20, 21, 22, and 23 were dissolved in 70% by weight of isopropyl alcohol and mixed with 10% by weight of an ethylene oxide condensation product (trade name: Emulphor EL, produced by BASF).

The determination of the fungicidal activity of the products thus formulated was effected by a standardized test of the American Phytopathological Society (Phytopathology, vol. 33, pages 627–632 (1943), and vol. 37, pages 354–356 (1947)).

The products were diluted with sufficient water to obtain aqueous emulsions containing from 10 to $10^{-3}$ millimols of active material per liter. 2 ml. of each of these emulsions were intimately contacted with 0.5 ml. of a spore suspension of the fungus to be tested containing 250,000 spores per ml. and applied in uniform drops to a slide coated with cellulose nitrate-ethyl acetate solution. The slides placed in moist chambers were left in incubators for 24 hours at 24° C. Then the spores were examined for germination determining the percentage spores inhibited from germinating based on two counts of 50 spores per concentration of each preparation with consideration given to a control test.

The percent spores inhibited from germinating by each concentration are converted into probit units and the latter are plotted against the dose or concentration of the fungicide on a logarithmic scale. The intersection of the straight killing line and the line for 50% inhibition of germination represents the $ED_{50}^{24\ hrs.}$ in terms of millimols per liter.

The $ED_{50}^{24\ hrs.}$ values thus obtained are shown in the following Table I in millimols per liter for each of the chlorination products. For comparison, the values obtained with the preparation known under the trade name of "Zineb" are also shown.

Table I

| Example | Compound | Chlorine content of carbon chain, percent | $ED_{50}^{24\ hrs.}$ millimols/liter |
|---|---|---|---|
| 2 | $HCl.NH_2C_8H_{13.1}Cl_{3.9}$ | 46.0 | 0.33 |
| 3 | $HCl.NH_2C_{10}H_{15.2}Cl_{5.8}$ | 52.2 | 0.018 |
| 4 | $HCl.NH_2C_{12}H_{17.6}Cl_{7.4}$ | 55.0 | 0.009 |
| 5 | $HCl.NH_2C_{14}H_{20.6}Cl_{8.4}$ | 55.2 | 0.009 |
| 7 | $HCl.NH_2C_9H_{15.7}Cl_{3.3}$ | 39.8 | 0.37 |
| 8 | $HCl.NH_2C_{12}H_{17.5}Cl_{7.5}$ | 55.3 | 0.005 |
| 9 | Hydrochloride of a chlorinated amine mixture. | 53.1 | 0.010 |
| 10 | $\frac{1}{2}H_2SO_4.NH_2C_{12}H_{19.7}Cl_{5.3}$ | 45.3 | 0.006 |
| 14 | $HCl.NH_2C_{11}H_{19.3}Cl_{6.2}$ | 52.9 | 0.12 |
| 20 | $HCl.NC_{10}H_{12.3}Cl_{2.7}$ | 34.3 | 0.072 |
| 21 | $HCl.NC_{12}H_{17.5}Cl_{3.5}$ | 35.6 | 0.051 |
| 22 | $HCl.NHC_{10}H_{16.9}Cl_{3.1}$ | 36.8 | 0.065 |
| 23 | $HCl.NHC_{13}H_{21.3}Cl_{4.7}$ | 42.1 | 0.045 |
| Products of Example 5 of British Patent 565,469. | hydrochloride of chlorinated and subsequently aminated dodecane. | 16.4 | 0.29 |
|  | Acetate of chlorinated and subsequently aminated dodecane. | 12.2 | 0.18 |
| Zineb (for comparison). | $\begin{array}{c}S\quad\quad\quad S\\ \parallel\quad\quad\quad\parallel\\ CNHCH_2CH_2NHC\\ \mid\quad\quad\quad\quad\mid\\ S\text{------}Zn\text{------}S\end{array}$ | 0 | 0.25 |

As may be seen from Table I, the fungicidal activity of chlorinated amine salts, apart from a few exceptions, is considerably better than that of aminated chlorohydrocarbons as may be produced by the process of British Patent 565,469 or, in a similar manner, by the process of German Patent No. 865,231. Attention should also be paid to the fact that, as was pointed out above, the production of chlorinated amine salts permits considerably better yields and a better utilization of the chlorine charged, which is not possible in case of producing aminated chlorohydrocarbons.

The values shown in Table I indicate an increase in activity by almost two powers of ten as compared with aminated chlorohydrocarbons.

The good fungicidal activity of chlorinated amine salts is observed not only on *Alternaris tenuis* but also on a number of other fungus spores such as *Botrytis cinerea*, *Macrosporium sarcinaeforme* and *Sclerotinia fructicola*.

The $ED_{50}^{24\ hrs.}$ values of the products prepared in accordance with Examples 3 and 4 towards the fungus spores mentioned above are shown in Table II in millimols/liter.

Table II

| Compound | *Botrytis cinerea*, $ED_{50}^{24\ hrs.}$ millimols/liter | *Macrosporium sarcinaeforme*, $ED_{50}^{24\ hrs.}$ millimols/liter | *Sclerotinia fructicola*, $ED_{50}^{24\ hrs.}$ millimols/liter |
|---|---|---|---|
| Example 3 $HCl.NH_2C_{10}H_{15.2}Cl_{5.8}$ | 0.004 | 0.035 | 0.015 |
| Example 4 $HCl.NH_2C_{12}H_{17.6}Cl_{7.4}$ | 0.0023 | 0.009 | 0.007 |
| $\begin{array}{c}S\quad\quad\quad S\\ \parallel\quad\quad\quad\parallel\\ CNHCH_2CH_2NHC\\ \mid\quad\quad\quad\quad\mid\\ S\text{------}Zn\text{------}S\end{array}$ (for comparison) | 0.013 | 0.11 | 0.09 |

This application is a continuation-in-part of application Serial No. 739,946, filed June 4, 1958, which is a continuation-in-part of application Serial No. 731,123, filed April 28, 1958, both now abandoned.

We claim:

A method of combatting fungi, which comprises treating materials susceptible to attack by fungus organisms with a chlorinated amine salt of the formula A·X, wherein A is a salt-forming component which is a member selected from the group consisting of HCl and $\frac{1}{2}H_2SO_4$ and X is a member selected from the group consisting of primary amines of the formula $R_1NH_2$, secondary amines of the formula $R_1R_2NH$ and tertiary amines of the formula $R_1R_2R_3N$, wherein $R_1$, $R_2$ and $R_3$ are each a member selected from the group consisting of hydrogen, alkyl and cyclo-alkyl radicals, at least one of $R_1$, $R_2$ and $R_3$ being a member selected from the group of alkyl and cyclo alkyl radicals containing from 10 to 18 carbon atoms and wherein said group member designated X additionally contains from 2 to 15 chlorine atoms, said chlorinated amine salts being solids at room temperature.

References Cited in the file of this patent

UNITED STATES PATENTS

| | | |
|---|---|---|
| 2,010,841 | Bender | Aug. 13, 1935 |
| 2,063,934 | Keller | Dec. 15, 1936 |
| 2,072,348 | Ward | Mar. 2, 1937 |
| 2,204,511 | Ralston | June 11, 1940 |
| 2,471,339 | Minich | May 24, 1949 |
| 2,698,849 | Aries | Jan. 4, 1955 |
| 2,814,582 | Hackmann | Nov. 26, 1957 |
| 2,894,987 | Stein et al. | July 14, 1959 |
| 2,902,401 | Harwood et al. | Sept. 1, 1959 |
| 2,907,793 | Craig | Oct. 6, 1959 |